United States Patent [19]

Burgarella et al.

[11] 4,085,414

[45] Apr. 18, 1978

[54] ELECTRONIC FLASH APPARATUS WITH EXTENDABLE ON/OFF SWITCH CONTROL APPARATUS

[75] Inventors: John P. Burgarella, Sudbury; George Turner, Jr., Newton; Robert L. Stephansky, Stoughton, all of Mass.

[73] Assignee: Polaroid Corporation, Cambridge, Mass.

[21] Appl. No.: 749,313

[22] Filed: Dec. 10, 1976

[51] Int. Cl.² ............... G03B 15/03; G03B 17/02; H01H 3/16
[52] U.S. Cl. .................... 354/145; 354/288; 200/61.58 R
[58] Field of Search ............ 354/23 R, 27, 32–35, 354/60 F, 126, 129, 135, 139, 141, 145, 148, 149, 202, 288, 354; 200/52 R, 61.58 R, 331

[56] References Cited

U.S. PATENT DOCUMENTS

| | | | |
|---|---|---|---|
| 3,868,700 | 2/1975 | Kuramoto | 354/288 |
| 3,930,184 | 12/1975 | Biber et al. | 354/141 |
| 4,007,469 | 2/1977 | Land et al. | 354/27 |

*Primary Examiner*—L. T. Hix
*Assistant Examiner*—William B. Perkey
*Attorney, Agent, or Firm*—Edward S. Roman

[57] ABSTRACT

An electronic flash unit attachable to the top of a camera shutter housing is provided with switch control apparatus which may be selectively extended into position so as to be engaged by the photographer when holding the camera in its normally expected manner. Engagement of the switch control apparatus by the photographer causes it to effect the closing of an ON-OFF switch thereby applying power to the flash unit whereas subsequent disengagement of the switch control apparatus causes it to automatically effect the opening of the ON-OFF switch.

23 Claims, 5 Drawing Figures

ELECTRONIC FLASH APPARATUS WITH EXTENDABLE ON/OFF SWITCH CONTROL APPARATUS

BACKGROUND OF THE INVENTION

1. Field of the Invention

The present invention relates to an electronic flash apparatus with extendable on/off switch control apparatus and more particularly to an electronic flash apparatus having extendable on/off switch control apparatus and adapted for use with cameras wherein the switch control apparatus when extended, is in position to be engaged by the camera user's hand when holding the camera in its normally expected manner.

2. Description of the Prior Art

Electronic flash units for providing artificial illumination during photographic exposures occurring under conditions of low ambient scene light intensity are well known in the art. Such electronic flash units are generally adapted to receive an external, substantially steady state, d-c battery voltage which powers a voltage converter in a conventional manner to convert the d-c voltage which may be in the order of 6 volts, to a suitable flash operating voltage. A charging current from the voltage converter is directed to a storage capacitor so as to gradually charge the storage capacitor to a d-c voltage which may be in the order of 350 volts. Means are also provided for selectively discharging the storage capacitor through a flash discharge tube to produce the photographic illuminating flash of light. An on/off switch may also be provided to control the power connection from the battery to the voltage converter. Thus, when a photographer anticipates using the electronic flash, he must initially turn on the on/off switch to power the voltage converter and thereafter wait a short period of time for the storage capacitor to become fully charged. After the storage capacitor in the electronic flash is discharged through the flash tube during a photographic exposure operation of the camera, the voltage converter will automatically operate to recharge the storage capacitor in anticipation of a subsequent photographic exposure unless the operator consciously remembers to turn off the on/off switch. Should the operator fail to consciously turn off the on/off switch and let the camera sit idle for a period of time, the voltage converter will continue to operate to maintain the charged condition of the storage capacitor thereby providing a constant current drain on the battery. A prolonged period of idleness with the on/off switch remaining on may ultimately result in the complete drainage of the battery so as to render the battery inoperative.

One approach to solving this problem has involved the use of a time-out circuit within the electronic flash so as to automatically disconnect the battery from the voltage converter if the flash is not fired within a prescribed time period. However, such a time-out circuit generally involves the use of a power transistor in series connection between the battery and voltage converter which decreases the actual power input to the voltage converter as a result of the high power losses inherent to the power transistor.

A so called "two-button camera" having an integral flash unit built therein has been disclosed in a copending application for U.S. patent Ser. No. 570,165 entitled "Photographic Apparatus", by E. H. Land, filed Apr. 21, 1975 now U.S. Pat. No. 4,007,469 in common assignment herewith. This two-button camera embodies a so called "grip switch" in the base portion thereof to turn on the electronic control circuit associated with both the camera and the electronic flash when the camera is held by the user. However, electronic flash units are generally configured to be detachable from the top of the lens housing portion of the camera thereby making it inconvenient for a grip switch, which constitutes an integral part of the camera, to control the detachable electronic flash unit. Since the electronic flash unit is normally connected above the shutter housing of the camera, it has also heretofore been inconvenient to provide the electronic flash unit with its own grip switch since most cameras are not normally held above their shutter housings.

It is therefore a primary object of this invention to provide means for automatically turning on and off an electronic flash unit as a function of whether the camera to which the electronic flash unit is attached is held in position in anticipation of taking a photographic picture.

It is also an object of this invention to provide an electronic flash unit with extendable on/off switch control apparatus for automatically controlling the electrical connection between the electronic flash and its associated battery as a function of whether the camera to which the electronic flash is connected is held in its normally expected position in anticipation to taking a photographic picture.

Other objects of the invention will in part be obvious and will in part appear hereinafter. The invention accordingly comprises the mechanism and system possessing the construction, the combination of elements and the arrangement of parts which are exemplified in the following detailed disclosure.

SUMMARY OF THE INVENTION

An electronic flash unit is provided for use with a camera of the type which may be held by a user in a normally expected manner and which includes means for providing a flash fire trigger signal at an appropriate time during a photographic exposure interval together with connecting apparatus for accommodating the removable connection of the flash unit to the camera. The flash unit comprises a housing within which there is disposed a storage capacitor, a flash discharge tube and means responsive to an applied voltage for charging the capacitor. Circuit means are also provided to respond to the trigger signal in order to discharge the capacitor through the discharge tube to produce an illuminating flash of light. In addition, electrical connecting means facilitate the electrical connection of the circuit means to the trigger signal providing means of the camera. Physical connecting means on the strobe housing are complementary to the camera connecting apparatus for facilitating the releasable, fixed, connection of the flash unit housing to the camera. Switch means which are connectable to a source of voltage, control the application of the voltage to the capacitor charging means. Means which are selectively extendable from the flash housing and operatively associated with the switch means operate to control the switch means. The control means are extendable subsequent to the fixed connection of the flash housing to the camera into interferring relation with at least a portion of the area otherwise expected to be occupied by a user's hand when holding the camera in its normal manner. The control means are thus extendable into position to be engaged by the user's hand when holding the camera and are also responsive to such engagement by the user's hand so as to cause the switch means to apply voltage to the capacitor charging means.

DESCRIPTION OF THE DRAWINGS

The novel features that are considered characteristic of the invention are set forth with particularity in the appended claims. The invention itself, however, both as to its organization and its method of operation, together with other objects and advantages thereof will be best understood from the following description of the illustrated embodiment when read in connection with the accompanying drawings wherein:

DESCRIPTION OF THE PREFERRED EMBODIMENTS

Figure 1:
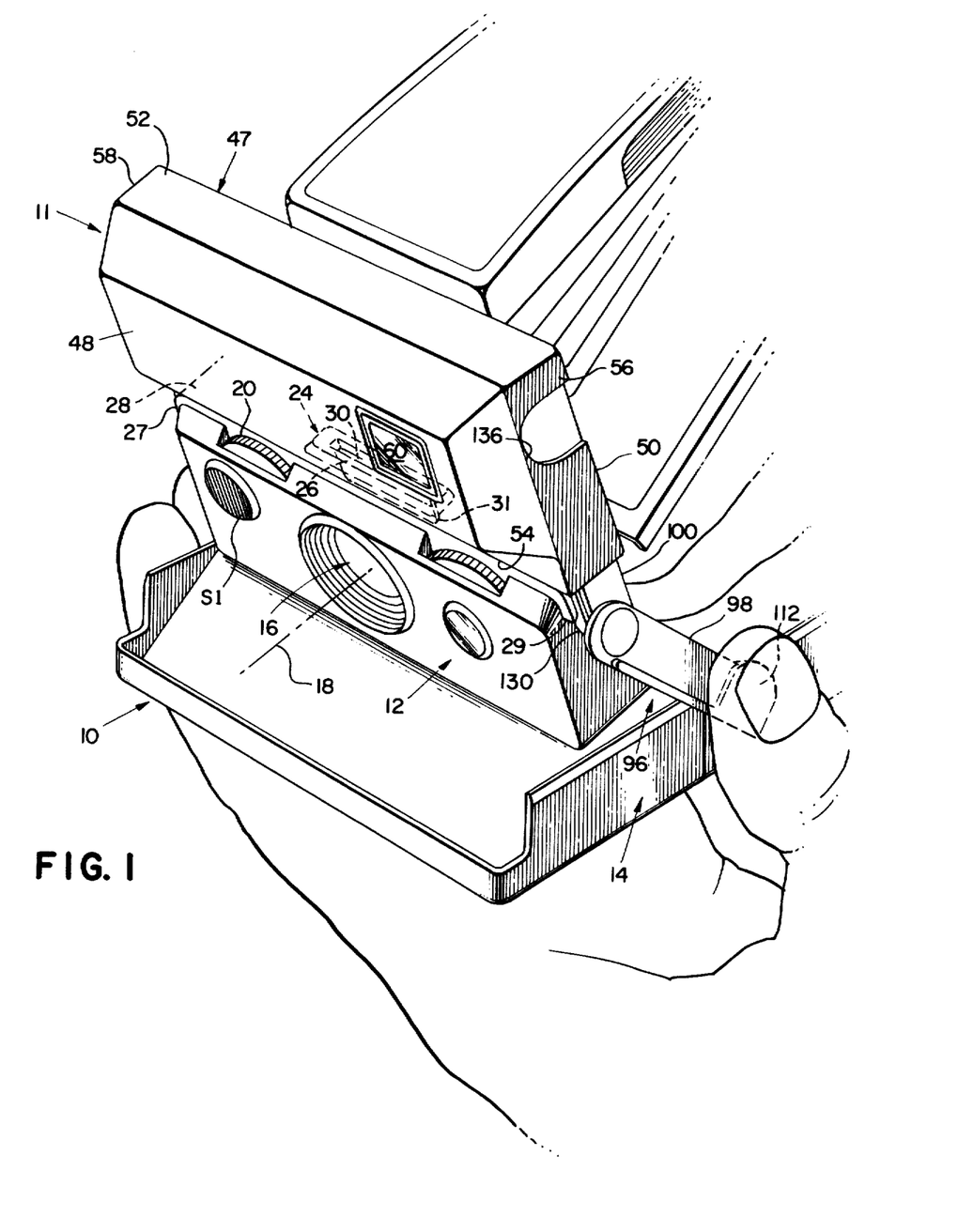
FIG. 1 is a perspective view of an electronic flash unit embodying the switch control of this invention in its operative mode when attached to a camera.

Referring now to FIG. 1, there is shown a front of a folding Polaroid SX-70 Land Camera 10 of the type more fully shown and described in U.S. Pat. No. 3,820,128 by J. Burgarella et al., entitled "Flat Photographic Control System" issued June 25, 1974 and assigned in common herewith. Camera 10 is shown as including a shutter housing section 12 mounted to pivot into a face down position on a base housing section 14 when the camera is folded for storage.

Figure 2:
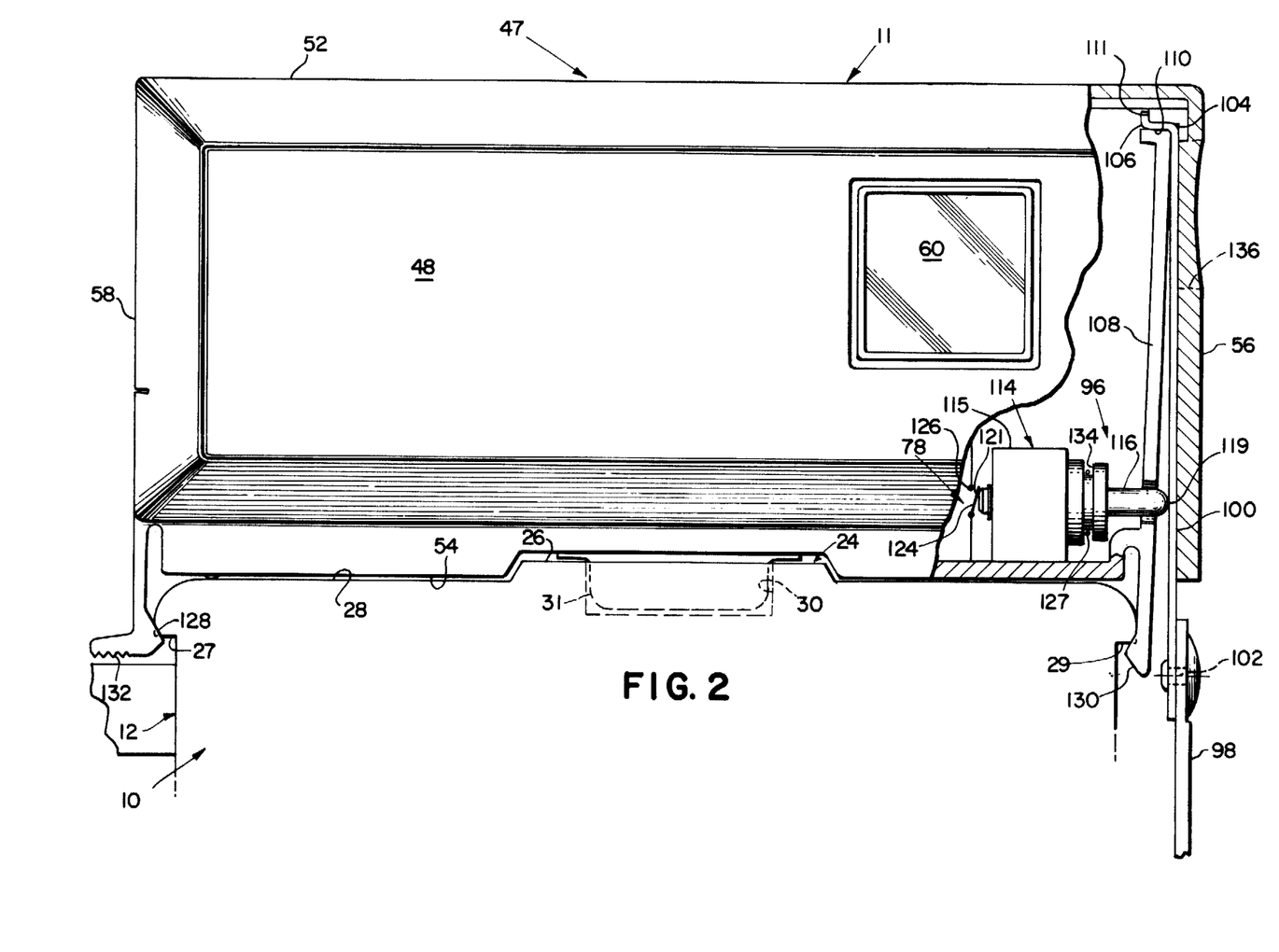
FIG. 2 is a front view, partly in cross-section, of the electronic flash unit of FIG. 1.

Housing section 12 includes a lens and shutter assembly 16 which may be of the type shown in U.S. Pat. No. 3,820,128 supra, having a picture taking axis 18, a focus wheel 20 for focusing the lens and an actuator button S1 for initiating the exposure cycle of the camera. Housing section 12 further includes a flash socket assembly 24, the details of which are more fully described in a U.S. Pat. No. 3,757,643 entitled "Photoflash Apparatus" by J. Burgarella, issued Sept. 11, 1973 in common assignment herewith. The flash socket assembly 24 functions in a well known manner as connecting apparatus for accommodating the removable fixed connection of an electronic flash unit as shown generally at 11 with respect to the camera 10. The flash socket assembly 24 in its preferred mode includes a boss 26 which extends from a wall 28 of the shutter housing section 12 and defines an entrance slot 30 which is generally orthogonal to picture taking axis 18 for accommodating receipt of a connector blade 31 from the strobe unit 11 as shown in FIG. 2. In the preferred mode, wall 28 further includes overhanging side portions 27 and 29 at the opposite ends thereof for reasons which will become more apparent from the following discussion.

Figure 3:
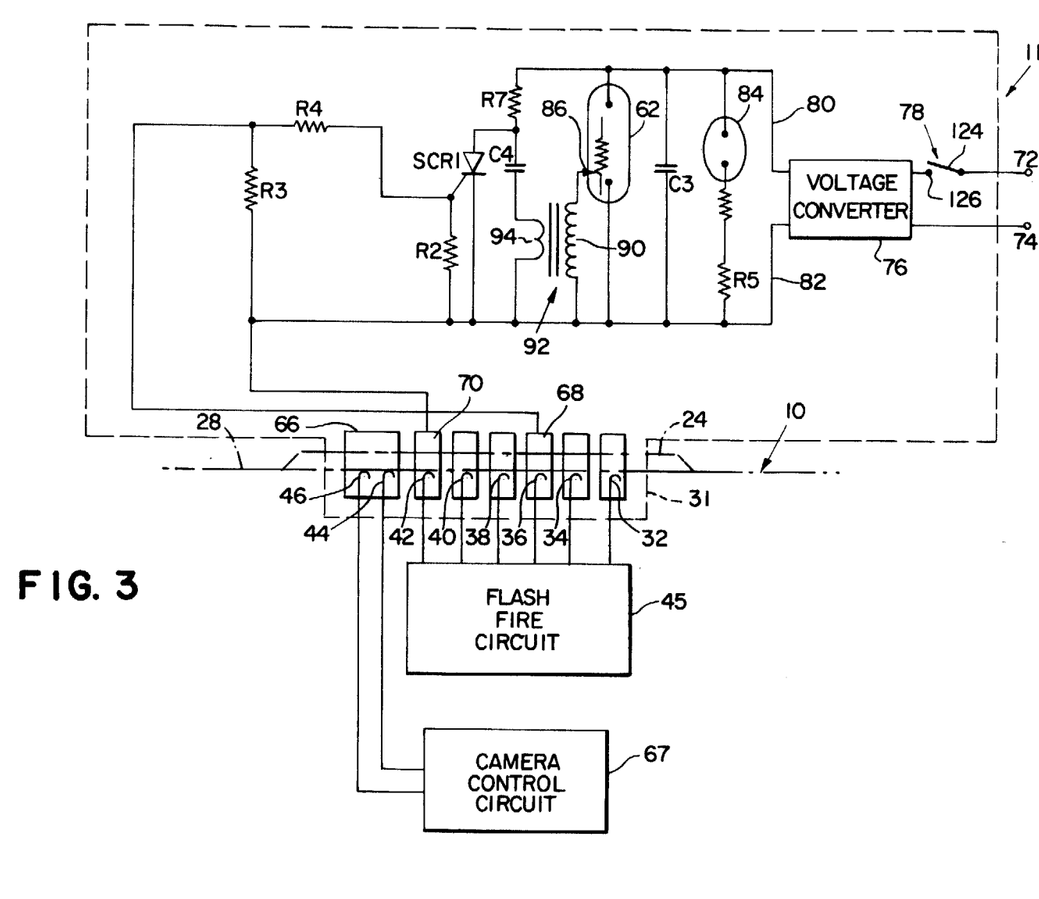
FIG. 3 is a schematic diagram of the electronic circuit of the electronic flash and camera of FIG. 1.

Referring now to the schematic diagram of FIG. 3, the flash socket assembly 24 is shown to include a first set of spaced apart contacts or terminal strips 32, 34, 36, 38, 40 and 42, and a second set of spaced apart contacts or terminal strips 44 and 46. The terminal strips 32–42, in turn, are connected to a flash fire circuit shown generally at 45 as is more fully described in U.S. Pat. No. 3,858,227 entitled "Adapter Apparatus for Flash Firing System", by S. Ellen et al., issued Dec. 31, 1974 in common assignment herewith.

Referring now to FIG. 1, there is shown the flash unit 11 comprising a parallelepiped housing 47 having a generally planar front wall member 48 in spaced apart generally parallel relation to a back wall member 50. The front and back wall members 48 and 50 are peripherally connected respectively by generally planar, spaced apart, parallel top and bottom wall members 52 and 54 together with generally planar, spaced apart, parallel side wall members 56 and 58. Front wall member 48 includes a transparent window 60 behind which is stationed an electronic flashtube 62 which functions in a well known manner. The connector blade 31 extends downwardly from the bottom wall member 54 to provide means for physically connecting to the flash socket assembly 24. Thus insertion of the connector blade 31 into the flash socket assembly 24 provides for the releasable fixed connection of the flash unit 11 to the camera 10.

The connector blade 31 is provided with a relatively wide terminal 66 that bridges the pair of terminal strips 44 and 46 upon insertion of the connector blade 31 within the socket assembly 24. Electrically shorting terminal strips 44 and 46 operates to signal a camera control circuit, as shown generally at 67, that the flash unit 11 is in position in the camera and ready to be used in a manner as is more fully described in U.S. Pat. No. 3,757,643 supra. Electrical connecting means comprising two additional terminals 68 and 70 are also provided on the connector blade 31 for making respective electrical contact with terminal strips 36 and 42 thereby facilitating receipt by the flash unit 11 of a flash fire trigger signal from the flash fire circuit 44 of the camera 10.

Terminals 68 and 70 on connector blade 31 connect respectively to the opposite sides of a resistor R3 which corresponds to the impedance of an unfired flashlamp for reasons which are more fully apparent in U.S. Pat. No. 3,858,227 supra. Thus, resistor R3 preferably has a value on the order of 4 ohms, approximating the resistance of a flashlamp before it is fired. A current limiting resistor R4 and a gate resistor R2 are connected in parallel with the resistor R3.

The flash unit 11 is also adapted to receive an external substantially steady state DC voltage by way of a pair of output terminals 72 and 74 for powering a conventional voltage converter 76. There is also provided an on/off switch 78 by which the user may control the power connection to the voltage converter 76 in the manner of this invention to be subsequently described in detail herein. The voltage converter 76 operates in a conventional manner to convert the DC voltage, as may be derived from a battery (not shown) which is preferably 6 volts, to a suitable flash operating voltage such as 350 volts. This voltage appears on a pair of output conductors 80 and 82 from the voltage converter 76.

A first circuit path across the output conductors 80 and 82 includes a ready light 84 and a resistor R5 in series therewith. The ready light 84 may be a conventional gas discharge lamp of any suitable design. The resistor R5 is selected to limit the current flowing through the lamp 84 to a suitable value. A second path across the conductors 80 and 82 comprises a storage capacitor C3 in a suitable size for storage of the energy necessary to fire the flash discharge tube 62. The discharge tube 62 has electrodes connected across the output conductors 80 and 82 in a third path. The tube 62 may be triggered to produce a flash of light when the capacitor C3 is sufficiently charged to allow the lamp 84 to glow and a relatively high voltage spike, such as 5,000 volts, is applied to the grid terminal 86 of the tube 62.

The grid 86 is connected to the output conductor 82 through the high voltage secondary winding 90 of a pulse transformer generally designated at 92. The low voltage primary winding 94 of the transformer 92 has one terminal connected to the conductor 82 and a second terminal connecting through a capacitor C4, in series with a resistor R7, to the conductor 80. A silicon controlled rectifier SCR1 has its anode terminal connected to the junction of the resistor R7 and the capacitor C4 and its cathode terminal connected to the conductor 82. Resistor R2 is connected between the gate and the cathode of the silicon controlled rectifier SCR1 to prevent false triggering of the controlled rectifier.

In order that the strobe unit be made as compact as possible, it may be desired that the voltage converter 76 be powered directly from a battery within the camera 10 in a manner as is more fully described in a copending application for U.S. patent Ser. No. 679,698 entitled "Compact Accessor Strobe For A Camera With Battery Enclosed Film Pack" by R. Kee filed Apr. 23, 1976 in common assignment herewith.

Figure 4:
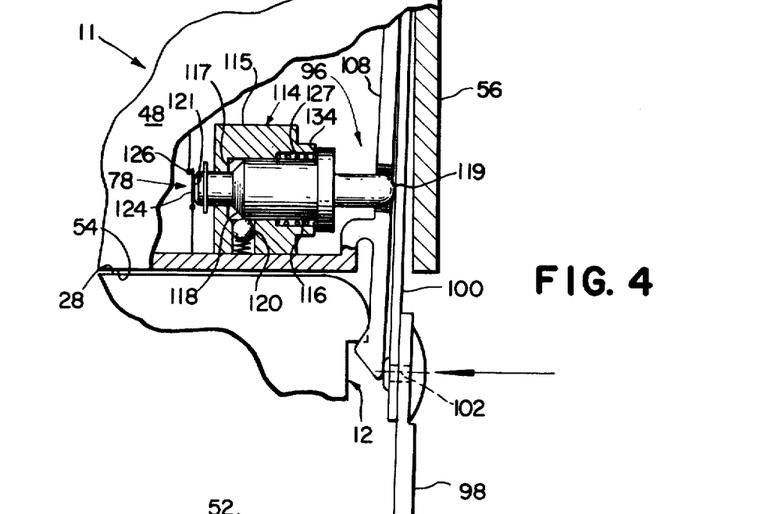
FIG. 4 is an enlarged fragmentary view, partly in cross-section of a portion of the electronic flash unit of FIG. 2.

Referring now to FIGS. 2 and 4, it can be seen that the flash unit 11 is provided with switch control means as shown generally at 96 for selectively controlling the on/off condition of switch 78 in the manner of this invention as will now be described. The switch control means includes a first elongated member 98 pivotally connected at one end thereof along an axis as shown at 102, to one end of a second elongated member 100. An interior, generally planar, wall member 108 is provided in generally parallel, spaced apart, relation inward of the side wall member 56 with the space therebetween being of sufficient width to accommodate limited lateral displacement of the elongated member 100 therebetween. The other end of the elongated member 100 is folded into two right angle bends as shown at 104 and 106 to provide a portion 110 thereof in overhanging relation with respect to the top edge of the interior wall member 108 to accommodate limited lateral pivotal movement of the elongated members 98 and 100 thereabout in directions generally orthogonal to the wall members 56 and 108 and generally coincident to the axis 102 about which the elongated members 100 and 98 are pivotally connected at 102. The right angle bend 106 of member 100 also engages an abutment face 111 in a manner operating to secure the pivot point and inhibit the overhanging portion 110 from wandering off the top edge of wall member 108.

The switch control means 96 additionally includes control apparatus as shown generally at 114 comprising a housing 115 through which there is provided a central bore 117 to accommodate reciprocal motion of a plunger 116 disposed therein. One end of the plunger 116 as shown at 119 is engaged by the elongated member 100 so as to translate inwardly into the housing 115 upon the lateral pivotal movement of the elongated members 100 and 98 toward the interior wall member 108. The plunger 116 preferably includes a truncated frustoconical surface 118 which cooperatively engages a spring loaded reciprocating ball 120 in the usual manner to provide a positive snap-action upon translation of the plunger 116 into the housing 115. The other end of the plunger 116, as shown at 121, is arranged to engage a resilient leaf member 124 of the on/off switch 78 in a manner operating to deflect the leaf member 124 into engagement with a contact 126 so as to close the on-off switch 78 upon translation of the plunger 116 into the housing 115. There is also provided a helical compression spring 127 around the plunger 116 in engagement with a raised peripheral edge 134 thereof to continuously urge the plunger 116 into translation outward of the housing 115 toward the side wall 56.

Figure 5:
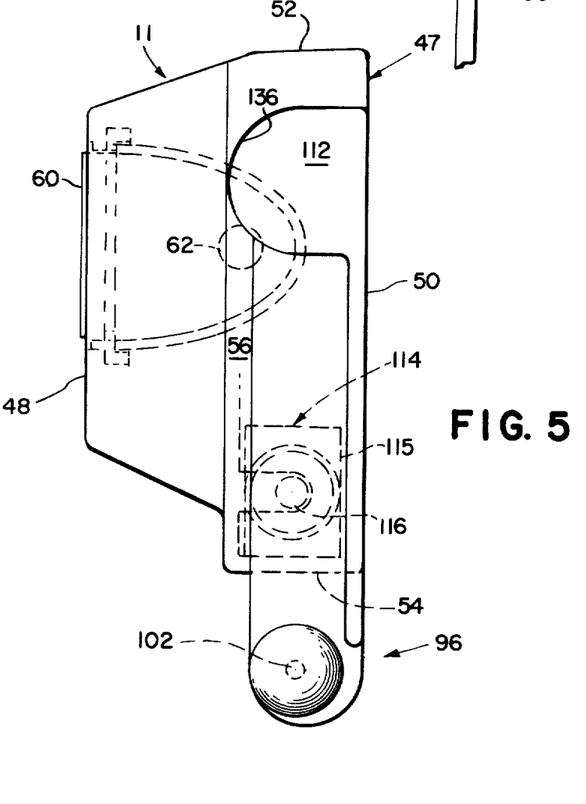
FIG. 5 is a side view of the electronic flash unit of FIG. 2.

The outward end of the elongated member 98 includes a raised grip portion 112 which may be engaged by the hand of a user in the manner of this invention to be subsequently described. The end wall 56 may also include a cut-away or recessed portion 136 complementary to the raised grip portion 112 thereby accommodating receipt of the raised grip portion 112 therein upon counterclockwise rotation of the elongated member 98 into its stowed position as shown in FIG. 5.

The strobe unit 11 may be used in conjunction with the camera 10 in the following manner. The connector blade 31 from strobe 11 is first inserted in the usual manner within the flash socket assembly 24 thereby establishing a removable fixed connection between the flash unit 11 and camera 10. The elongated member 98 may thereafter be rotated in a clockwise direction as viewed from FIG. 1 from its stowed position adjacent the cutaway portion 136 to its fully extended position as shown in FIG. 1 with the raised grip portion 112 in spaced apart relation aside the base housing section 14 of the camera.

Polaroid SX-70 type Land cameras are held in a normally expected manner by the user who grasps the underlying surface of the base housing section 14 in the palm of his hand while engaging the opposed sides of the base housing section 14 with his thumb and fingers respectively as shown in FIG. 1. As is now readily apparent, extension of the elongated member 98 in the aforementioned manner operates to move the raised grip portion 112 into interfering relation with that portion of the camera base housing section 14 that would otherwise be occupied by the user's thumb when grasping the camera in the normally expected manner.

Thus, the user upon pivotally extending the elongated member 98, will thereafter when attempting to grasp the camera in the usual manner engage the raised grip portion 112 with his thumb so as to laterally pivot the elongated members 98 and 100 toward the interior wall member 108. As is readily apparent, such lateral pivoting of the elongated members 98 and 100 operates to translate the plunger 116 into the housing 115 so as to compress the spring 127 while simultaneously displacing the reciprocating ball 120 radially outward. At the same time, the other end of the plunger at 121 engages the resilient leaf 124 of the on-off switch 78 so as to deflect the leaf 124 into electrical connection with the contact 126. In this manner, charging current from the battery is selectively applied to the voltage converter 76 only when the camera is grasped by the user in anticipation of photographing a particular scene.

Once the camera is grasped and the switch 78 closed in the aforementioned manner, the user must wait for the voltage converter 76 to charge the capacitor C3 to its prescribed value as indicated by the ready light 84 being lit. The user may thereafter implement a photographic exposure cycle in the usual manner by depressing the actuator button S1. During the exposure interval, the flash fire circuit 45 provides an appropriate flash fire trigger signal to the terminals 68 and 70 which causes a current to flow through the resistors R3 in parallel with R2 and R4 so as to gate the silicon controlled rectifier SCR1 into condition. Assuming that the capacitors C3 and C4 are charged as previously discussed, with the SCR1 conducting, the capacitor C4 will discharge, causing the pulse transformer 92 to gate the flash tube 62 into conduction to produce a light flash.

Should the user thereafter decide to leave the camera in its erect position with the flash unit still attached, he may do so without worry as to whether he has turned off the strobe since his release of the raised grip portion 112 will automatically operate to open the on-off switch 78. The plunger 116 is automatically translated to its terminal position outside the housing 115 by virtue of the spring 127. In this manner, resilient leaf 124 of switch 78 is allowed to deflect to its normally open condition so as to block the flow of charging current from the battery to the voltage converter 76. In addition, the elongated arm members 98 and 100 are translated laterally outward toward the sidewall 56 in a direction generally orthogonal thereto.

Thus, unnecessary drainage of the battery which might otherwise occur from prolonged idle periods with the voltage converter 76 connected to the battery are automatically prevented regardless of whether the user consciously remembers to turn off the strobe. Prevention of such unnecessary battery discharge is particularly critical when the strobe unit 11 is adapted to receive charging current from a battery situated within the folding camera 10 as more fully discussed in an application for U.S. patent Ser. No. 679,698 supra. Such a battery would be of the type which is carried in a Polaroid SX-70 Land film pack as manufactured and sold for use in the Polaroid SX-70 Land Camera.

In the preferred embodiment, the means for physically connecting the flash unit 11 to the camera 10 in a releasable manner may additionally include a pair of spaced apart, resilient, C-type clips 128, 130 which are adapted to resiliently engage respective overhanging side portions 27 and 29 of the wall member 28. Resilient clip 128 may additionally include a cantilevered portion 132 extending laterally outward therefrom to accommodate engagement by a user in an upward direction in a manner operating to deflect the C-type clip 128 out of engagement with the overhanging side portion 27. The overhanging side portions 27 and 29 may thus form part of the connecting apparatus which permits the removable fixed connection of the flash unit 11 with respect to the camera 10.

Wherein the camera 10 is herein described as being a Polaroid SX-70 Land Camera 10, it will be readily understood that the invention is by no means so limited and may be applicable to other cameras such as Polaroid's most recently introduced Pronto Camera which also utilizes Polaroid's SX-70 type film. In addition, it is by no means necessary that the flash unit 11 be made detachable from the camera 10 in the aforementioned manner and may instead be made integral to the shutter housing 12 while still embodying the switch control means 96 of this invention. Therefore, since certain changes may be made in the above described system and apparatus without departing from the scope of the invention herein involved, it is intended that all matter contained in the description thereof, or shown in the accompanying drawings shall be interpreted as illustrative and not in a limiting sense.

What is claimed is:

1. An electronic flash unit for use with a camera of the type which may be held by a user in a normally expected manner and which includes means for providing a flash fire trigger signal at an appropriate time during a photographic exposure interval together with connecting apparatus for accommodating the removable fixed connection of said flash unit with respect to the camera, said flash unit comprising:
    a housing;
    a storage capacitor;
    a flash discharge tube;
    means responsive to an applied voltage for charging said capacitor;
    circuit means responsive to the trigger signal for discharging said capacitor through said discharge tube to produce an illuminating flash of light;
    electrical connecting means for facilitating the electrical connection of said circuit means to the trigger signal providing means of the camera;
    physical connecting means complementary to the camera connecting apparatus for facilitating the releasable fixed connection of said flash unit housing to the camera;
    switch means connectable to a source of voltage for controlling the application of the voltage to said capacitor charging means; and
    means selectively extendable from said flash housing and operatively associated with said switch means for controlling said switch means, said control means being extendable, subsequent to the fixed connection of said flash housing to the camera, into interfering relation with at least a portion of the area otherwise expected to be occupied by the user's hand when holding the camera in its normal manner, said control means thereby being extendable into position to be engaged by the user's hand when holding the camera and also being responsive to such engagement by the user's hand as to cause said switch means to apply voltage to said capacitor charging means.

2. The electronic flash unit of claim 1 wherein said control means includes means responsive to disengagement by the user to cause said switch means to disconnect the substantially steady state voltage to said capacitor charging means.

3. The flash unit of claim 2 wherein: said flash unit housing includes at least one substantially planar wall member; said control means when fully extended includes a portion in movable spaced relation with respect to said planar wall portion such that said engagement by the user's hand operates to laterally displace said movable portion from a first position toward a second position, said displacement occuring in a direction generally orthogonal to said wall member; and said switch means includes a mechanical switch having at least an open and closed condition, said mechanical switch being so disposed with respect to said movable portion of said control means as to change from one condition to another condition in response to said lateral displacement of said movable portion of said control means.

4. The flash unit of claim 3 wherein said switch disconnecting means are resilient for returning said switch back from its said other condition to its said one condition while simultaneously displacing said movable portion of said control means back to its said first position upon disengagement thereof by the user.

5. The flash unit of claim 2 wherein said control means includes an elongated member rotatably connected at one end with respect to said flash housing, said elongated member being rotatable outward from a stowed position closely adjacent said flash housing into said extended position so as to be engaged by the user's hand subsequent to said flash being fixedly connected to the camera.

6. The flash unit of claim 5 wherein said flash housing includes a recessed portion complementary to said elongated member of said control means for receipt of said elongated member upon the rotation thereof into said stowed position.

7. The flash unit of claim 6 wherein said flash unit housing includes at least one substantially planar wall member and said elongated member pivots in a plane generally parallel to said planar wall member.

8. The flash unit of claim 2 wherein said flash unit housing includes at least one substantially planar wall member; said control means includes a first elongated member rotatably connected at one end to a second elongated member which is displaceably mounted in close adjacent relation to said wall member, said first elongated member being rotatable outward in a plane generally parallel to said wall member from a stowed position closely adjacent said wall member into said extended position so as to be engaged by the user's hand subsequent to said flash housing being fixedly connected to the camera.

9. The flash unit of claim 8 wherein engagement of said first elongated member by the user's hand operates to laterally displace said first and second elongated members from a first position toward a second position, said lateral displacement occuring in a direction generally coincident to the axis about which said first elongated member is rotatably connected; and said switch means includes a mechanical switch having at least an open and closed condition, said mechanical switch being so disposed with respect to said second elongated member of said control means as to change from one condition to another condition in response to said lateral displacement of said first and second elongated members.

10. The flash unit of claim 9 wherein said switch disconnecting means are resilient for returning said switch back from its said other condition to its said one condition while simultaneously displacing said first and second elongated members of said control means back to their first position upon disengagement of said first elongated member by the user's hand.

11. The flash unit of claim 9 wherein said flash housing includes a cutaway portion complementary to said first elongated member of said control means for receipt of said first elongated member upon the rotation thereof into said stowed position.

12. The flash unit of claim 9 wherein said second elongated member is pivotally connected with respect to said wall member so that said lateral displacement occurs about said point of pivot between said second elongated member and said wall member.

13. A camera and electronic flash apparatus of the type which may be held by a user in a normally expected manner, said camera and flash apparatus comprising:
   a housing;
   means for defining a focal plane;
   means for controlling the transmission of scene light to the focal plane to define a photographic exposure interval;
   means for providing a flash fire signal at an appropriate time during the photographic exposure interval;
   a storage capacitor;
   a flash discharge tube;
   means responsive to an applied voltage for charging said capacitor;
   circuit means electrically connecting to said flash trigger means and responding to said flash fire trigger signal for effecting the discharge of said capacitor through said discharge tube to produce an illuminating flash of light;
   switch means connectable to a source of substantially steady state voltage for controlling the application of the steady state voltage to said capacitor charging means; and
   means selectively extendable from said housing and operatively associated with said switch means for controlling said switch means, said control means being extendable into interfering relation with at least a portion of the area otherwise expected to be occupied by the user's hand when holding said camera and flash apparatus in its normal manner, said control means thereby being extendable into position to be engaged by the user's hand when holding said camera and flash apparatus and also being responsive to such engagement by the user's hand as to cause said switch means to apply the voltage to said capacitor charging means, said control means including an elongated member rotatably connected at one end with respect to said housing, said elongated member being rotatable outward from a stowed position closely adjacent said housing into said extended position so as to be engaged by the user's hand.

14. The camera and flash apparatus of claim 13 wherein said control means includes means responsive to disengagement by the user to cause said switch means to disconnect the voltage to said capacitor charging means.

15. The camera and flash apparatus of claim 14 wherein: said housing includes at least one substantially planar wall member; said control means when fully extended includes a portion in movable spaced relation with respect to said planar wall portion such that said engagement by the user's hand operates to laterally displace said movable portion from a first position toward a second position, said displacement occuring in a direction generally orthogonal to said wall member; and said switch means includes a mechanical switch having at least an open and closed condition, said mechanical switch being so disposed with respect to said movable portion of said control means as to change from one condition to another condition in response to said lateral displacement of said movable portion of said control means.

16. The camera and flash apparatus of claim 15 wherein said switch disconnecting means are resilient for returning said switch back from its said other condition to its said one condition while simultaneously displacing said movable portion of said control means back to its said first position upon disengagement thereby by the user.

17. The camera and flash apparatus of claim 13 wherein said housing includes a recessed portion complementary to said elongated member of said control means for receipt of said elongated member upon the rotation thereof into said stowed position.

18. The camera and flash apparatus of claim 17 wherein said housing includes at least one substantially planar wall member and said elongated member pivots in a plane generally parallel to said planar wall member.

19. The camera and flash apparatus of claim 14 wherein said housing includes at least one substantially planar wall member; said control means includes a first elongated member rotatably connected at one end to a second elongated member which is displaceably mounted in close adjacent relation to said wall member, said first elongated member being rotatable outward in a plane generally parallel to said wall member from a stowed position closely adjacent said wall member into said extended position so as to be engaged by the user's hand.

20. The camera and flash apparatus of claim 19 wherein engagement of said first elongated member by the user's hand operates to laterally displace said first and second elongated members from a first position toward a second position, said lateral displacement occuring in a direction generally coincident to the axis about which said first elongated member is rotatably connected; and said switch means includes a mechanical switch having at least an open and closed condition, said mechanical switch being so disposed with respect to said second elongated member of said control means as to change from one condition to another condition in response to said lateral displacement of said first and second elongated members.

21. The camera and flash apparatus of claim 20 wherein said switch disconnecting means are resilient for returning said switch back from its said other condition to its said one condition while simultaneously displacing said first and second elongated members of said control means back to their first position upon disengagement of said first elongated member by the user's hand.

22. The camera and flash apparatus of claim 20 wherein said housing includes a recessed portion complementary to said first elongated member of said control means for receipt of said first elongated member upon the rotation thereof into said stowed position.

23. The camera and flash apparatus of claim 20 wherein said second elongated member is pivotally connected with respect to said wall member so that said lateral displacement occurs about said point of pivot between said second elongated member and said wall member.

* * * * *